May 29, 1928.
G. E. SHELDRICK
1,671,553
COUNTER
Filed Oct. 22, 1923
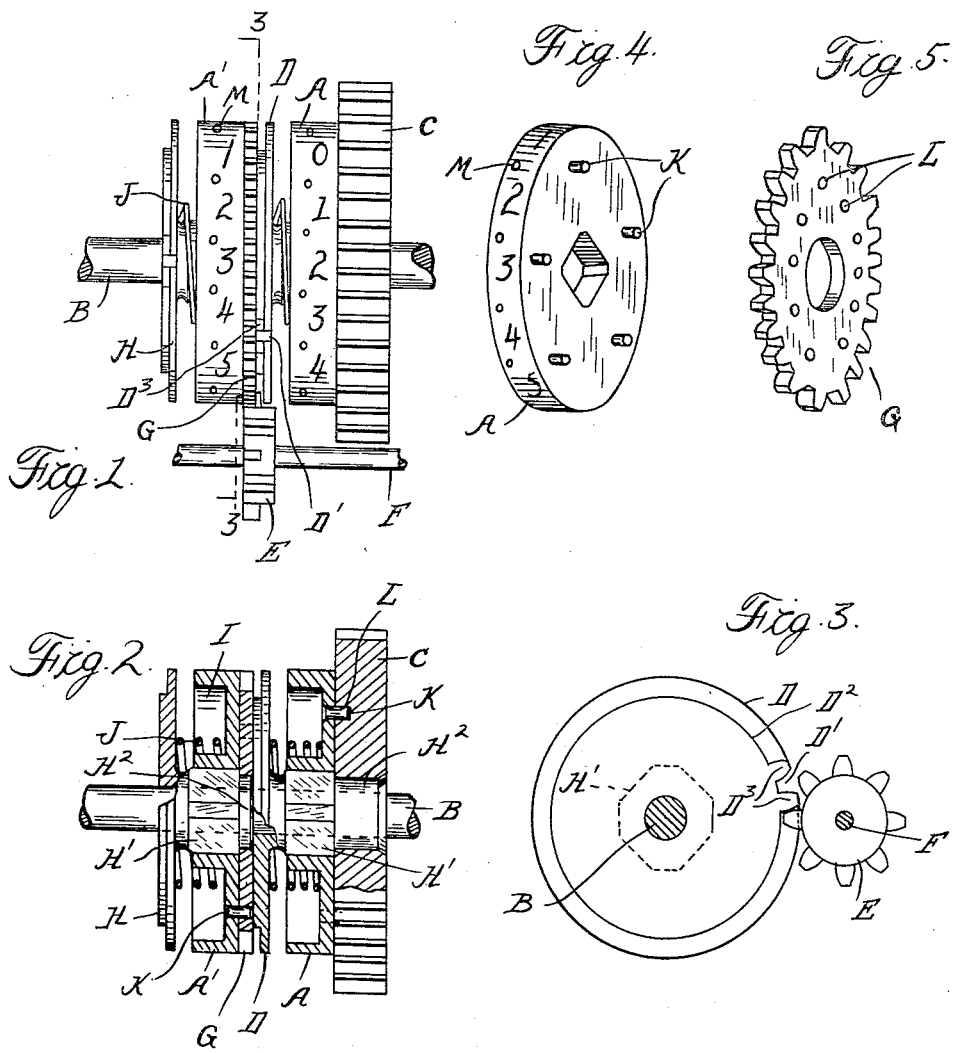
Inventor
George E. Sheldrick
By Whittemore, Hulbert, Whittemore, & Belknap
Attorneys Patented May 29, 1928.

1,671,553

UNITED STATES PATENT OFFICE.

GEORGE E. SHELDRICK, OF DETROIT, MICHIGAN ASSIGNOR, BY MESNE ASSIGNMENTS, TO PITNEY-BOWES POSTAGE METER COMPANY, OF STAMFORD, CONNECTICUT, A CORPORATION OF DELAWARE.

COUNTER.

Application filed October 22, 1923. Serial No. 670,189.

This invention relates to counters and relates particularly to counters comprising coaxial rotative counter wheels.

Among the objects of the invention are to provide a counter having a positive or a non-yielding drive connection to its counter wheels; to provide counter wheels which for the purpose of setting may be turned in either direction; and to provide counter wheels which in setting the same are subjected to a lateral movement so as to quite definitely indicate whether or not the wheel is in a proper set position.

In the drawings:—

Figure 1 is a plan view in front elevation of the improved counter showing two of the counter wheels thereof;

Figure 2 is an axial sectional view of the same;

Figure 3 is a cross section view on line 3—3 of Figure 1;

Figure 4 is a perspective view of the tens counter wheel; and

Figure 5 is a perspective view of the drive gear for said counter wheel.

In these views, the reference characters A and A' designate respectively a units and a tens counter wheel mounted rotatively adjacent upon a shaft B. It is to be understood that any number of additional counter wheels may be also arranged upon said shaft according to the magnitude of the numbers to be counted. A gear C has a driving connection with the wheel A at one side of the latter and at its other side a disk D is connected to said wheel A, said disk having a peripheral notch D' therein and having a portion $D^2$ of reduced diameter formed with two gear teeth $D^3$, one at each side of the notch D' (see Figure 3). Once in each revolution of the counter wheel A and disk D, the notch D' and teeth $D^3$ thereof are adapted to mesh with a pinion E mounted upon a counter shaft F, and meshing also with a gear G having a drive connection with the counter wheel A'. The angular advance of said counter wheel, thus effected, is equal to one-tenth ($\frac{1}{10}$) of a revolution. The two counter wheels have the customary numerals forming upon their peripheral faces a series extending from naught to nine, as is best seen in Figure 1. The teeth of the pinion E are alternately short and long, as best seen in Figure 1, the short teeth stopping short of the notched periphery of the disk D and the long teeth overlapping said disk and locking said pinion from rotation except when the notch D' is in a position to receive one of said long teeth. At the left side of the counter wheel A' a disk H is arranged duplicating the disk D already described. Each of the disks D and H is provided with an integral hub H', the external cross section of which is substantially square, as is seen in Figure 3, while the interior openings thereof are round to loosely fit the shaft B. The wheels A' and A have substantially square openings in which the square hubs H' slidably fit. The free extremities $H^2$ of the hubs H' are round to respectively rotatively mount the small gear G and the large gear C, the portion H' of the disk D being relatively long to mount the relatively thick gear C. The left side faces of the two counter wheels are chambered, as indicated at I, and within the chambers I coiled springs J are compressed between said counter wheels and the disks D and H respectively. Each of the two said counter wheels carry a set of five drive pins K projecting laterally to engage in openings L in the gears C and G, there being ten (10) of said openings in each gear, as Figure 5 clearly illustrates. The effect of the springs J is to urge the wheels A and A' to the right hand limit of their sliding travel upon the hubs H', thus normally engaging the pins K in the registered holes L. Thus, said pins normally establish a positive or rotatively non-yielding drive connection from the gears C and G to the counter wheels. The normal spaced relation between the counter wheels and disks D and H is such that by actuating either counter wheel slidingly upon the hub H' toward the adjacent disk D or H the pins K of said wheel may be withdrawn from the openings L of the corresponding drive gear, the wheel then being free to turn in either direction relative to its drive gear to establish any desired setting. To facilitate such setting, each of the counter wheels has in its peripheral face a series of small radial sockets M in which a suitable pin (not shown) may be inserted for the purpose both of shifting the wheels laterally in opposition to their springs J and rotatively setting the wheels.

It will be evident from the preceding description that for each complete revolution of the units wheel, the tens wheel will advance one-tenth ($\frac{1}{10}$) of a revolution or the distance between two consecutive numbers upon its periphery. Similarly any number of counter wheels may be driven in the same manner one from another. A most important feature of the described construction is the establishment through the pins K of a positive or non-yielding rotative drive connection between each counter wheel and the drive gear which forms a unit assembly with said wheel. Thus, it is possible to drive the described counter at quite a high speed without risk of the counter wheel being carried on by its own momentum through a greater angular advance than that of the associated gear. It will, of course, be understood that the gear C must be driven at one tenth ($\frac{1}{10}$) the speed of the shaft (not shown), the revolutions of which are to be counted since, for each revolution of said shaft, said gear must advance the units counter wheel A only one tenth ($\frac{1}{10}$) of a revolution.

It is a further advantageous feature of the described construction that the counter wheels, when sufficiently shifted to the left, may be turned relative to their respective drive gears in whichever direction will most quickly establish the desired setting. Also it is to be noted that the counter wheels in assuming their set positions are required to undergo an appreciable lateral travel which minimizes the possiblity of the wheel through carelessness being left between two of its ten relative positions to the corresponding drive gear. When, as in well known prior constructions, the wheels are set entirely through rotative actuation there is no such certain indication as to whether the wheel is being left in an intermediate position.

What I claim as my invention is:—

1. In a counter, a counter wheel; and members coaxial therewith at opposite sides thereof for respectively driving said wheel and transmitting the drive therefrom; said wheel being normally spaced from the transmitting member and engaged with the driving member, said wheel also being axially movable into and out of driving engagement with the driving member, and being rotative in unison with said transmitting member.

2. A unit assembly comprising a counter wheel; a driving gear therefor at one side thereof; a transmitting member at the other side thereof, said wheel being normally spaced apart from said driven member; means normally establishing a positive non-yielding drive connection between said driving gear and wheel, said means being releasable by movement of the wheel toward the transmitting member; and means establishing a constant drive connection between the wheel and the transmitting member in any position of such wheel.

3. A unit assembly comprising a counter wheel; a driving gear and a transmitting member between which said wheel is coaxially arranged, said wheel being normally spaced apart from said driven member; a member projecting centrally from the driven member and rotatively carrying the driving member and slidably but non-rotatively carrying said wheel; a spring between the driven member and wheel urging the latter toward the driving member, and a releasable drive connection between the driving member and wheel, normally maintained by said spring; the wheel being axially movable upon said projecting member away from the driving member and toward the driven member to effect release of said drive connection.

4. A unit assembly comprising a counter wheel; a drive member and a driven transmitting member coaxial with said wheel, one at each side thereof, said wheel being normally spaced apart from said driven member, a drive connection between said driven member and wheel releasable by movement of the wheel toward the driven member; a supporting member carried by the driven member slidably carrying the wheel and establishing a drive connection between the driven member and the wheel, said supporting member also rotatively supporting the driving member; and spring means for moving the wheel toward the driving member and normally establishing said drive connection.

In testimony whereof I affix my signature.

GEORGE E. SHELDRICK.